United States Patent
Breton et al.

(10) Patent No.: US 6,384,108 B1
(45) Date of Patent: *May 7, 2002

(54) WATERFAST INK JET INKS CONTAINING AN EMULSIFIABLE POLYMER RESIN

(75) Inventors: Marcel P. Breton, Mississauga; Guerino G. Sacripante, Oakville; Harvey Bruce Goodbrand, Hamilton; Carol A. Jennings, Etobicoke, all of (CA); Susanne Birkel, Glashutten (DE)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/536,236

(22) Filed: Sep. 29, 1995

(51) Int. Cl.[7] .............................. C09D 11/00; C09D 5/00
(52) U.S. Cl. .................... 523/161; 524/495; 524/603; 524/605
(58) Field of Search .................... 523/161; 524/495, 524/603, 605; 106/20 D, 20 R, 22 R, 23 R, 23 C; 528/272, 274, 279, 293, 308

(56) References Cited

U.S. PATENT DOCUMENTS

| | | | |
|---|---|---|---|
| 4,375,357 A | 3/1983 | Wingard et al. | 8/647 |
| 4,471,079 A | 9/1984 | Enami | 523/161 |
| 4,627,875 A | 12/1986 | Kobayashi et al. | 106/22 |
| 4,737,190 A | 4/1988 | Shimada et al. | 106/22 |
| 4,855,344 A * | 8/1989 | Nealy et al. | 524/86 |
| 5,156,675 A | 10/1992 | Breton et al. | 106/22 |
| 5,169,437 A | 12/1992 | You | 106/20 D |
| 5,207,824 A | 5/1993 | Moffatt et al. | 106/22 R |
| 5,230,733 A | 7/1993 | Pawlowski | 106/22 R |
| 5,281,630 A | 1/1994 | Salsman | 521/48.5 |
| 5,310,887 A | 5/1994 | Moore et al. | 534/729 |
| 5,364,462 A | 11/1994 | Crystal et al. | 106/22 R |
| 5,369,210 A | 11/1994 | George et al. | 528/293 |

OTHER PUBLICATIONS

K.R. Barton, "Sulfopolyesters: New Resins For Water-Based Inks, Overprint Lacquers, and Primers," American Ink Maker, Oct. 1993, pp. 70–72.

* cited by examiner

Primary Examiner—James J. Seidleck
Assistant Examiner—U. K. Rajguru
(74) Attorney, Agent, or Firm—Oliff & Berridge, PLC; Eugene O. Palazzo

(57) ABSTRACT

An ink for ink jet printing includes submicron-sized particles in a liquid vehicle, with the submicron-sized particles including a colorant dispersed in an emulsifiable polymer resin. The polymer resin may contain a base chain, such as polyester, having hydrophilic groups, such as alkali sulfonated groups, for emulsifying the resin in water.

4 Claims, No Drawings

WATERFAST INK JET INKS CONTAINING AN EMULSIFIABLE POLYMER RESIN

BACKGROUND OF THE INVENTION

This invention relates to improved waterfast inks for use in ink jet printing processes. More particularly, this invention relates to ink jet inks having excellent waterfastness and print quality characteristics that can be used in various printing processes such as thermal ink jet and acoustic ink jet processes.

Ink jet printing processes and apparatus for such processes are well known in the art. Two major types of ink jet processes are thermal ink jet and acoustic or piezoelectric ink jet processes.

In thermal ink jet printing processes, the printer typically employs a resistor element in a chamber provided with an opening for ink to enter from a plenum. The plenum is connected to a reservoir for storing the ink. A plurality of such resistor elements is generally arranged in a particular pattern, called a primitive, in a printhead. Each resistor element is associated with a nozzle in a nozzle plate, through which ink is expelled toward a print medium, such as paper. The entire assembly of printhead and reservoirs comprises an ink jet pen. In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alpha numeric characters, performs area-fill, and provides other print capabilities on the medium. The thermal ink jet printing process is described in more detail, for example, in U.S. Pat. Nos. 5,169,437 to You and 5,207,824 to Moffatt et al., the entire disclosures of which are incorporated herein by reference.

In an acoustic or piezoelectric ink jet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means such as a pulse converter and then applied to the piezoelectric oscillator. A change in pressure on the ink within an ink chamber in the printhead caused by the recording signal results in droplets of ink being ejected through an orifice to a recording medium. Such an ink jet system is described in more detail, for example, in U.S. Pat. No. 4,627,875 to Kobayashi et al., the entire disclosure of which is incorporated herein by reference.

In these and other ink jet recording processes, it is necessary that the ink being used meet various stringent performance characteristics. Such performance characteristics are generally more stringent than those for other liquid ink applications, such as for writing instruments (e.g., a fountain pen, felt pen, etc.). In particular, the following conditions are generally required for inks utilized in ink jet printing processes:

(1) the ink should possess liquid properties such as viscosity, surface tension and electric conductivity matching the discharging conditions of the printing apparatus, such as the driving voltage and driving frequency of a piezoelectric electric oscillator, the form and material of printhead orifices, the diameter of orifices, etc.

(2) the ink should be capable of being stored for a long period of time without causing clogging of printhead orifices during use.

(3) the recording liquid should be quickly fixable onto recording media, such as paper, film, etc., such that the outlines of the resulting ink dots are smooth and there is minimal blotting of the dotted ink.

(4) the resultant ink image should be of high quality, such as having a clear color tone and high density. The ink image should also have high gloss and high color gamut.

(5) the resultant ink image should exhibit excellent waterfastness (water resistance) and lightfastness (light resistance).

(6) the ink should not chemically attack, corrode or erode surrounding materials such as the ink storage container, printhead components, orifices, etc.

(7) the ink should not have an unpleasant odor and should not be toxic or inflammable.

(8) the ink should exhibit low foaming and high pH stability characteristics.

Various inks for ink jet printing processes are known in the art. For example, various ink jet inks are disclosed in U.S. Pat. Nos. 4,737,190 to Shimada et al. and 5,156,675 to Breton et al. Generally, the ink jet inks of the prior art are aqueous inks, comprising a major amount of water, a humectant and/or a co-solvent, and a dye. By selecting specific humectants, dyes, or other components, it is possible to adjust the print characteristics of the resultant ink.

U.S. Pat. No. 5,364,462 to Crystal et al. describes dye-based inks that are described as providing improved stability, jetting characteristics, solubility and waterfastness. The aqueous dye-based ink includes a dye and a hydroxyethylated polyethylene imine polymer. The hydroxyethylated polyethylene imine polymer may also be substituted with hydroxypropylated polyethylene imine or epichlorohydrin-modified polyethylene imine polymers. Aprotic solvents, such as dimethyl sulfoxide and tetramethylene sulfone may also be added to the ink to improve the solubility and stability of the dye solution.

Sulfopolyester resins are known and are generally available commercially from Eastek Inks, a business unit of Eastman Chemical Company. These sulfopolyester resins are suitable for use in water-based inks, overprint lacquers and primers, as described in Kenneth R. Barton, "Sulfopolyesters: New Resins for Water-Based Inks, Overprint Lacquers and Primers," *American Ink Maker*, pp. 70–72 (October, 1993). The sulfopolyester resins may be prepared by the polycondensation reaction of selected dicarboxylic acids, glycols and sodio sulfoorganodicarboxylic acids or glycols to produce linear structures.

Although numerous ink jet inks are presently available, they generally do not meet all of the above-described requirements, while also providing excellent print quality on plain paper. In particular, the inks generally used in ink jet printing processes, while producing acceptable print quality, do not produce the high print quality that is achieved by using dry toner compositions, such as in electrostatographic imaging processes.

The need continues to exist in the ink jet industry for improved ink jet inks that satisfy the above-described requirements while providing high quality prints on a wide variety of recording media, including plain paper. Although some currently available ink jet inks may provide waterfast images with better substrate latitude, the inks are unacceptable in that they generally smear and have poor latency and maintainability characteristics. In addition, such inks are generally difficult to manufacture. Thus, there is still a need in the ink jet ink industry for improved black and colored inks that can be easily prepared and obtained at a lower cost.

SUMMARY OF THE INVENTION

The present invention provides ink jet ink compositions that have excellent waterfastness and high print quality on a wide variety of print media, including paper and transparencies. Ink compositions of the present invention also meet the various end-user requirements described above, including wide color gamut, high gloss, lightfastness, high stability, improved drying time and reduced odor retention and toxicity while being compatible with the ink jet printing environment and apparatus. Ink jet ink compositions of the present invention also provide significantly improved print quality on plain paper, as compared to other ink compositions. Significantly, the present invention also provides for improved adhesion of some colorants, such as pigments, on print media while allowing for a higher loading of colorant in the ink than was previously possible.

Specifically, this invention provides an ink for ink jet printing, comprising submicron-sized particles in a liquid vehicle, said particles comprising a colorant dispersed in an emulsifiable polymer resin.

The present invention thus provides ink jet ink compositions containing colored particles having a number average particle size of from about 2 nm to about 500 nm, wherein the colored particles comprise a colorant dispersed within an emulsifiable polymeric resin.

DETAILED DESCRIPTION OF PREFERRED EMBODIMENTS

The ink jet ink compositions of the present invention generally comprise colored particles dispersed in a liquid vehicle the colored particles are comprised of an emulsifiable ionic polymer containing a dye or pigment dispersed therein. The polymeric resin is further comprised of an ionic group in sufficient amounts such that the polymer spontaneously emulsifies to submicron-sized particles in a solvent such as water when heated to above its glass transition temperature. In the present invention, the emulsifiable polymer resin preferably includes a base resin (polymer chain) with hydrophilic groups attached thereto. The hydrophilic groups in the polymer control the emulsifying characteristics of the resin, and render the polymer resin emulsifiable in a solvent such as water.

For use in the ink jet inks of the present invention, the base resin of the emulsifiable polymer resin may include any suitable polymers, such as polyamides, polyimides, poly(meth)acrylate, polystyrene, copolystyrene-copoly(meth)acrylate, polyester, mixtures thereof and the like. Preferably, the base resin of the emulsifiable polymer resin comprises polyester. Other known resins may be used for the base resin of the emulsifiable polymer resin in embodiments of the present invention, so long as the objects of the present invention are achieved and the above-described conditions for ink jet printing are satisfied. In particular, the base resin for use in the emulsifiable polymer resin of inks of the present invention is selected to meet three requirements: 1) the resin must be compatible with cosolvents used in the inks; 2) the resin must be sufficiently thermally stable to avoid decomposition of the polymer resin on heaters used in the printhead ejectors, for example, to prevent kogation and poor heater efficiency; and 3) the resin must be stable with respect to possible hydrolysis of the polymers used in the ink. Furthermore, the base resin used in the emulsifiable polymer resin of the present invention must not be soluble, without the hydrophilic groups, in the aqueous medium used for the ink.

The emulsifiable polymer resin used in the ink jet inks of the present invention also includes a hydrophilic group attached to the base resin polymer chain. The hydrophilic group is included to render the polymer resin emulsifiable in water or another solvent. Any suitable hydrophilic group may be attached to the base resin polymer chain to render the resultant polymer emulsifiable in a solvent, so long as the objects of the present invention are achieved. Examples of suitable hydrophilic groups include, but are not limited to, carboxylic acid alkali salts, phosphonate salts, ammonium halides, alkali sulfonated groups, mixtures thereof and the like. Preferably, the hydrophilic group attached to the base resin polymer chain is an alkali sulfonated group with an alkali metal counterion such as sodium, calcium, lithium, potassium, cesium, barium, magnesium, hydrogen, mixtures thereof and the like.

In the present invention, the final particle size (average diameter) of the polymer compound may generally be controlled by adjusting the concentration of hydrophilic groups attached to the base resin polymer chain. For example, as the concentration of hydrophilic groups increases, the polymer resin emulsifiers to smaller sized particles; and at high enough concentration of hydrophilic groups, for example greater than 10 mole percent of the resin, the resin becomes soluble in the liquid. In contrast, as the concentration of hydrophilic groups decreases, the polymer resin increases in particle size when emulsified in the liquid; and if the concentration of the hydrophilic group is too low, for example, less than 2.5 mole percent of the resin, the corresponding particles may have a particle size greater than 500 nm and may not be useful as an ink component. Therefore, if the concentration of the hydrophilic groups becomes too high or too low, the ability of the polymer resin to self-emulsify to submicron particle sizes of from about 2 nanometers to about 500 nanometers is decreased. Accordingly, in the polymer resin of the present invention, hydrophilic groups are attached to the base resin polymer chain in an amount sufficient to enable the polymer resin to self-emulsify to a desired submicron particle size. Preferably, the concentration of hydrophilic groups is from about 2.5 mole % to about 15 mole % of the resin, and more preferably is from about 5 mole % to about 10 mole % of the resin.

In embodiments of the present invention, the emulsifiable polymer resin is preferably a polyester derived from a diol and a diester. In a preferred emulsifiable polymer resin, the resin comprises about 50 mole percent of a diol such as an alkylene glycol or oxyalkylene glycol, and about 50 mole percent of a diester. The diester component in the preferred emulsifiable polymer resin is preferably a mixture of from about 2.5 to about 15 mole percent of a sulfonated aromatic moiety, preferably a sodium sulfonated aromatic moiety, such as dimethyl 5-sulfoisophthalate sodium salt, and the remaining portion is from about 35 to about 47.5 mole percent of a diester such as dimethyl terephthalate, dimethyl naphthalenedicarboxylate, dimethyl isophthalate, mixtures thereof and the like. Such an emulsifiable polymer resin of this embodiment has repeating units of the following general formula:

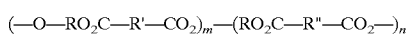

wherein R' is phenylene, ethenylene, terephthalylene, isophthalylene, bisphenolene, bis(alkyloxy) bisphenolene, cyclohexylene, an alkylene group or the like; R" is an alkali sulfonate derivative of phenylene, ethenylene, terephthalylene, isophthalylene, bisphenolene, bis(alkyloxy (bisphenolene, cyclohexylene, alkylene group, mixtures thereof, derivatives thereof and the like; R is an alkyl group or an oxyalkylene group; and n and m represent the random segments of the polymer and are integers of from 1 to about 300 each. The molecular weight of said emulsifiable resin may be from about 500 to about 50,000 and preferably from about 1,000 to about 20,000. More preferably, the molecular weight is from about 1,000 to about 5,000. Additional suitable emulsifiable polyester resins are described, for example, in U.S. Pat. No. 5,348,832, the entire disclosure of which is incorporated herein by reference.

In embodiments of the present invention, the emulsifiable polymer resin preferably has a glass transition temperature of from about 10° C. to about 100° C., and more preferably of from about 20° C. to about 80° C. Most preferably, the glass transition temperature is from about 35° C. to about 80° C. The emulsification of the polymer is usually accomplished at a temperature above its glass transition temperature in a liquid media. Hence, if the glass transition temperature of the polymer is above 100° C., then the polymer may not self-emulsify in water at atmospheric pressure. Conversely, if the glass transition temperature of the polymer is too low, then the resultant print media may become very sticky.

Various methods for producing such emulsifiable polymer resins are known in the art, and will be apparent to one skilled in the art based on the instant disclosure. For example, sulfonated polyester resins are available from Eastek Inks, a business unit of Eastman Chemical Company, as the Sulfopolyester Series 1000, 1100, 1200 and 2100 products. Such sulfopolyester resins, and the method for production thereof, are described, for example, in Kenneth R. Barton, "Sulfopolyesters: New Resins for Water-Based Inks, Overprint Lacquers and Primers," *American Ink Maker*, pp. 70–72 (October, 1993), the entire disclosure of which is incorporated herein by reference. The disclosed process may be adjusted as necessary, in accordance with the present invention, to provide suitable emulsifiable polyester resins.

The ink jet inks of the present invention also contain a colorant. Generally, the colorant may be either a dye or a pigment, although combinations of dyes and pigments may be used in some embodiments.

When dyes are used in the ink jet inks of the present invention, any suitable commercially available dye may be used to impart the desired color characteristics to the ink jet ink. In embodiments, preferred dyes are the anionic dyes, cationic dyes, reactive dyes, and alcohol- and oil-soluble dyes. Fluorescent dyes can also be used in the ink jet ink compositions of the present invention. Specific examples of such dyes include Bernacid Red 2BMN, Pontamine Brilliant Bond Blue A, BASF X-34, Pontamine, Food Black 2, Carodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz), Carodirect Yellow RL (Direct Yellow 86, Carolina Color and Chemical), Cartasol Yellow GTF Liquid Special 110 (Sandoz, Inc.), D&C Yellow #10 (Acid Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E- 6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4- phenylstilben-4-yl)benzoxazoles, 4,4-bis(triazo-2-yl) stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

Other suitable dyes for use in the present invention include polyoxyalkylene substituted organic chromophores. Examples of such dyes are those having the following formula:

where A is an organic chromophore, Y is a straight chain or branched polyoxyalkylene substituent comprised of from 1 to about 200 radicals of $C_2$ to $C_{18}$ alkylene oxides, and p represents the number of polyoxyalkylene oxide groups chains per chromophore and may be from 1 to 6, preferably 1 to 4. For example, two polyoxyalkylene substituents may be bonded to the chromophore through a trivalent linking group. The chromophore is generally covalently bonded to the polyoxyalkylene substituent by a linking group such as N, $NR^3$, O, S, $SO_2$, $SO_2N$, $SO_2NR^3$, $CO_2$, CON, or $CONR^3$, where $R^3$ is H, $C_1$ to $C_{12}$ alkyl, phenyl or benzyl. These dyes may also be represented generally by the formula:

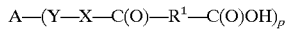

where A is an organic chromophore; Y is a polyoxyalkylene substituent having from 1 to about 200 radicals of $C_2$ to $C_{18}$ alkylene oxides; p is an integer from 1 to 6; X is a nucleophile selected from O, $NR^2$ and S, where $R^2$ is H or a $C_1$ to $C_{18}$ alkyl; $R^1$ is selected from alkylene, alkenylene, phenylene and phenylenealkylene, any of which may be optionally substituted with alkyl, alkenyl or aryl groups, provided that the total number of carbon atoms is from 2 to 30. The dyes are described in more detail in U.S. Pat. No. 5,310,887, the entire disclosure of which is incorporated herein by reference.

In the ink jet inks of the present invention, it is preferred that the dye or dyes be alcohol- or oil-soluble. The oil-soluble property assists the dye or dyes in being dispersed in the emulsifiable polymer resin, without affecting the emulsifiability, performance or stability of the polymer during production or use of the ink. In addition, alcohol- and oil-soluble dyes provide ink jet inks having better waterfastness as compared to water-soluble dyes.

In addition, the colorant for the ink jet ink compositions of the present invention may be a pigment, or a mixture of one or more dyes and/or one or more pigments. The pigment may be black, cyan, magenta, yellow, red, blue, green, brown, mixtures thereof, and the like. Examples of suitable black pigments include various carbon blacks such as channel black, furnace black, lamp black, and the like, such as Levanyl Black A-SF (Bayer) and Sunsperse Carbon Black LHD 9303 (Sun Chemicals). Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as CI 60710, CI Dispersed Red 15, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue Xo2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected.

Preferably, in embodiments of the present invention where pigments are used, the pigment particle size is as small as possible to enable a stable dispersion of the particles in the self-emulsifying polymer resin and to prevent clogging of the ink channels when the ink is used in an ink jet printer. Preferred particle average diameters are generally from about 0.001 to about 0.3 micron. Preferably, at least 80% of the pigment particles should have an average particle diameter of less than about 0.1 micron.

The colorant may be present in the ink jet ink compositions of the present invention in any effective amount to impart the desired colorant properties to the ink. Typically, in pigment-based inks, the ink comprises from about 5 to about 400 percent by weight colorant by weight of the polymer resin. Preferably, the ink contains from about 10 to about 250 percent by weight and even more preferably from about 20 to about 150 percent by weight colorant per weight of emulsifiable polymer. For dye-based inks, the ink generally comprises from about 5 to about 50% by weight colorant by weight of the polymer resin. Preferably, the dye-based ink contains from about 10 to about 40% by weight, and even more preferably from about 20 to about 35% by weight, colorant per weight of emulsifiable polymer. However, weight percent colorant outside of these ranges is permissible as long as the objects of the invention are achieved. A mixture of colorants in the proportions desired to obtain a specific shade may also be employed.

The ink jet ink compositions of the present invention may generally be prepared by dispersing the colorant material into the emulsifiable polymer resin, removing any solvent from the self-emulsifying polymer resin-colorant mixture, and heating the resultant mixture in water and/or another solvent to emulsify the resin mixture to the desired ink particle size.

In embodiments of the present invention, the ink jet ink composition is prepared by initially mixing the colorant with the emulsifiable polymer resin. Such mixing may be conducted, for example, by dissolving or melt mixing the colorant and polymer resin. Optionally, the mixing step may be conducted in a suitable solvent, such as water and/or an organic solvent. For example, in embodiments where the colorant is a water-insoluble dye, it may be preferred to utilize as the solvent an organic solvent that is miscible with the dye. The selection of a solvent depends, of course, upon the mixing characteristics of the colorant and the polymer resin. Once a suitable colorant-polymer mixture is obtained, any undesired solvent is removed from the mixture, for example by heating the mixture and/or drying the mixture under a vacuum atmosphere.

The colorant-polymer mixture is next emulsified in a suitable solvent to produce the final ink jet ink composition. In this step, the colorant-polymer mixture is emulsified in a suitable solvent, such as water and/or a co-solvent, to emulsify the resin, thereby producing colored particulates having a desired particle size suitable for ink jet ink applications. Generally, in embodiments, the ink jet ink composition is prepared by heating from about 2 to about 20% by weight of the colorant-polymer mixture in the solvent, at a temperature above the glass transition temperature of the emulsifiable polymer resin. The result is a stable, homogeneous ink jet ink composition containing colored particulates having a number average particle size of from about 2 nm to about 500 nm, wherein the colored particulates comprise colorant and polymer resin. Preferably, the particle size of the colored particles in the ink jet ink composition is from about 5 nm to about 300 nm, and even more preferably from about 5 nm to about 100 nm.

The liquid vehicle of the inks of the present invention may consist of water, or a co-solvent may also be added to the water vehicle, if desired. When a co-solvent is used, it is preferred that the co-solvent is a miscible organic component. Examples of suitable co-solvents include, but are not limited to, ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones such as sulfolane, alcohol derivatives, carbitol, butyl carbitol, cellusolve, ether derivatives, amino alcohols, ketones, N-methylpyrrolidinone, 2-pyrrolidone, cyclohexylpyrrolidone, hydroxyethers, amides, sulfoxides such as dimethyl sulfoxide, lactones, mixtures thereof and the like.

When mixtures of water and one or more co-solvents are selected as the liquid vehicle, the ratio of water to co-solvent may be in any effective range. Typically the ratio of water to co-solvent is from about 100:0 to about 30:70, preferably from about 97:3 to about 50:50, although the ratio can be outside these ranges. The non-water component of the liquid vehicle, when present, generally serves as a humectant, which typically has a boiling point higher than that of water.

Humectants may also be added to the inks of the present invention. For example, suitable humectants include, but are not limited to, glycols, N-methyl-pyrrolidone, 2-pyrrolidone, N-methyl-2-pyrrolidone, 1,2,-dimethyl-2-imidazolidinone, mixtures thereof and the like. Humectants may be included in the ink to prevent water evaporation and sedimentation. Additionally, certain humectants such as N-methyl-pyrrolidone and 2-pyrrolidone have been found to improve solubility in the ink and thus serve the dual role as humectant and co-solvent. In addition, some humectants such as 2-pyrrolidone have been found to resist ink build-up on jet faces during extended printing, which is preferred for cartridge refillability. When incorporated into the inks of the present invention, approximately 1 to 10 percent of one or more humectants by weight may be added to the ink to prevent sediment build-up on print heads.

Other components may also be incorporated into the inks of the present invention. For example, inks of the present invention may include such additives as biocides, buffering agents, anti-mold agents, pH adjustment agents, electric conductivity adjustment agents, chelating agents, anti-rusting agents, and the like. Such additives may be included in the ink jet inks of the present invention in any effective amount, as desired. For example, such additives may be included in an amount ranging from about 0.0001 to about 4.0 percent by weight, and preferably from about 0.01 to about 2.0 percent by weight of the ink. More preferably, such additives may be included in an amount ranging from about 0.01 to about 0.5 percent by weight of the ink and most preferably from about 0.05 to about 0.3 percent by weight. The amount included will depend, of course, on the specific component being included.

Examples of buffering agents include, but are not limited to, agents such as sodium borate, sodium hydrogen phosphate, sodium dihydrogen phosphate, mixtures thereof and the like. Examples of biocides include, but are not limited to, Dowicil™ 150, 200, and 75; benzoate salts; sorbate salts; mixtures thereof and the like.

Additional pH controlling agents may also be included in the ink, if desired. Examples of such pH controlling agents suitable for inks of the present invention include, but are not limited to, acids; bases, including hydroxides of alkali metals such as lithium hydroxide, sodium hydroxide and potassium hydroxide; phosphate salts; carbonate salts; carboxylate salts; sulfite salts; amine salts; amines such as diethanolamine and triethanolamine; mixtures thereof and the like. When present, the pH controlling agent is preferably included in an amount of up to about 1 percent by weight, and preferably from about 0.01 to about 1 percent by weight.

Other additives may also be added. For example, trimethylol propane may be added to the ink jet ink compositions, for example, to reduce paper curl or as an anti-cockle agent. These additives, such as trimethylol propane, generally have a solubility parameter in the range of from about 27 to about 35 $MPa^{1/2}$, and preferably between 29 and 33 $MPa^{1/2}$, and can bind to paper through hydrogen bonding. Other examples of such anti-curl agents include, but are not limited to, N-acetylethanolamine, N-N-diacetyl piperazine, triethylene glycol, N-(2-aminoethyl) ethanolamine, 1,4-butanediol, N-ethyl formamide, 2-methyl-1,5-pentanediol, 1,5-pentanediol, diethylene glycol, 2,2'-oxybisethanol, mixtures thereof and the like. Preferably, the concentration of such anti-curl agents in ink jet inks of the present invention is between about 5 and about 50% by weight and more preferably between about 10 and about 30% by weight.

Other suitable additives are disclosed, for example, in U.S. Pat. No. 4,737,190 to Shimada et al., the entire disclosure of which is incorporated herein by reference.

Preferably, in embodiments of the present invention, the ink composition and especially the colorant-polymer mixture contained therein are neutrally charged. Thus in embodiments, charge control agents and the like may be added (or omitted) as necessary to neutralize any charge in the ink composition that arises from the presence of other components.

In forming the final ink jet ink compositions of the present invention, certain physical properties should be satisfied. For example, ink compositions for use in ink jet recording processes should have appropriate viscosity and surface tension characteristics. In the present invention, it is preferred that the ink jet ink composition has a viscosity of from about 0.7 to about 15 cP at 25° C. More preferably, the viscosity is from about 1 to about 10 cP, and even more preferably from about 1 to about 5 cP. It is also preferred that the ink jet ink composition has a surface tension of from about 20 to about 70 dynes/cm at 25° C. More preferably, the surface tension is from about 25 to about 60 dynes/cm, and even more preferably from about 30 to about 55 dynes/cm.

The invention will now be described in detail with reference to specific preferred embodiments thereof. All parts and percentages are by weight unless otherwise indicated.

EXAMPLES

Example 1

Preparation of a sulfonated polyester resin derived from propanediol, dimethylterephthalate and 5 mole percent of dimethyl-5-sulfoisophthalate sodium salt A sulfonated polyester resin is prepared in a 1 L Parr reactor equipped with a magnetic stirrer, distillation apparatus, and a bottom drain valve. Into the reactor is charged 172 g dimethylterephthalate, 141 g 1,2-propanediol, 29.6 g dimethyl 5-sulfoisophthalate sodium salt, and 0.5 g of butyltin oxide hydroxide (commercially available from Elf Atochem as FASCAT). The mixture is heated in the reactor to 165° C. and stirred at 200 rpm for one hour. The mixture is then raised slowly to 190° C. over a five hour period, during which time methanol is collected in the distillation receiver. The mixture is then heated to 200° C. and vacuum is applied from atmospheric pressure to 1 torr over a two hour period, during which time 1,2-propanediol is collected in the distillation receiver. 75 g 1,2-propanediol is collected during this process. The temperature is then raised slowly to 220° C., and the vacuum decreased to 0.2 torr over a one hour period. The reactor is then repressurized to atmospheric pressure, and the product is charged through the bottom drain valve. The sulfonated polyester resin is analyzed for its onset glass transition temperature utilizing a Dupont differential Scanning Calorimeter at a heating rate of 10° C./min., which is found to be 31° C. The resin of this example can then be emulsified in water at 50° C., resulting in an emulsion with a particle size of about 25 nanometers.

Example 2

Preparation of a Black Dye-Based Ink

A black dye-based ink composition is prepared using the sulfonated polyester of Example 1. A dye-polymer resin mixture is prepared by dissolving about 5 g of the black dye Orasol Black RL (available from Ciba-Geigy) with about 10 g of the sulfonated polyester of Example 1 in ethyl acetate. The mixture is heated to 75° C. to remove solvent from the mixture, which is then dried in a vacuum desiccator. 5.7% by weight of the dye-polyester mixture is then heated in water at 75° C. with stirring for 15 minutes.

The result is an aqueous cosolvent-less ink. The effective diameter of the colored particles is 150 nm (BI-90 particle sizer v 2.2). The filtered ink, after being filtered through a 0.8 micron filter, is easily jetted with a Hewlett Packard Deskjet Printer onto Xerox 4024 Xerographic Paper to give waterfast images with excellent edge acuity.

Example 3

Preparation of a Black Pigment-Based Ink

A black pigment-based ink composition is prepared using the sulfonated polyester of Example 1. A pigment-polymer resin mixture is prepared by dissolving about 5 g of the black pigment Levanyl Black A-SF (available from Bayer Corporation) with about 10 g of the sulfonated polyester of Example 1 in water. The mixture is heated to about 100° C. to remove the water solvent from the mixture, which is then dried in a vacuum desiccator. 30% by weight of the pigment-polyester mixture is then heated in water at 75° C. with stirring for 15 minutes.

The result is an aqueous cosolvent-less ink. The effective diameter of the colored particles is 195 nm (BI-90 particle sizer v 2.2). The filtered ink, after being filtered through a 0.8 micron filter, is easily jetted with a Hewlett Packard Deskjet Printer onto Xerox 4024 Xerographic Paper to give waterfast images with excellent edge acuity.

Example 4

Preparation of a sulfonated polyester resin derived from propanediol, dLethylene glycol, dimethylterephthalate and 5 mole percent dimethyl-5-sulfoisophthalate sodium salt.

A sulfonated polyester resin is prepared in a 1 L Parr reactor equipped with a magnetic stirrer, distillation apparatus, and a bottom drain valve. Into the reactor is charged 410 g dimethylterephthalate, 312 g 1,2-propanediol, 62 g of diethylene glycol, 69,6 g dimethyl 5-sulfoisophthalate sodium salt, and 0.8 g of butyltin oxide hydroxide (commercially available from Elf Atochem as FASCAT). The mixture is heated in the reactor to 165° C. and stirred at 200 rpm for one hour. The mixture is then raised slowly to 190° C. over a five hour period, during which time methanol is collected in the distillation receiver. The mixture is then heated to 200° C. and vacuum is applied from atmospheric pressure to 1 torr over a two hour period, during which time 1,2-propanediol is collected in the distillation receiver. 160 g 1,2-propanediol is collected during this process. The temperature is then raised slowly to 220° C., and the vacuum decreased to 0.2 torr over a one hour period. The reactor is then repressurized to atmospheric pressure, and the product is charged through the bottom drain valve. The sulfonated polyester resin is analyzed for its onset glass transition temperature as in Example I, which is found to be 60° C. The resin of this example can then be emulsified in water at 50° C., resulting in an emulsion with a particle size of about 20 nanometers.

Example 5

Preparation of a sulfonated polyester resin drived from propanediol, diethylene glycol, dimethylterephthalate and 7.5 mole percent of dimethyl-5-sulfoisophthalate sodium salt.

A sulfonated polyester resin is prepared in a 1 L Parr reactor equipped with a magnetic stirrer, distillation apparatus, and a bottom drain valve. Into the reactor is charged 3888 g dimethylterephthalate, 312 g 1,2-propanediol, 62 g of diethylene glycol, 104.4 g dimethyl 5-sulfoisophthalate sodium salt, and 0.8 g of butyltin oxide hydroxide (commercially available from Elf Atochem as FASCAT). The mixture is heated in the reactor to 165° C. and stirred at 200 rpm for one hour. The mixture is then raised slowly to 190° C. over a five hour period, during which time methanol is collected in the distillation receiver. The mixture is then heated to 200° C. and vacuum is applied from atmospheric pressure to 1 torr over a two hour period, during which time 1,2-propanediol is collected in the distillation receiver. 160 g 1,2-propanediol is collected during this process. The temperature is then raised slowly to 220° C., and the vacuum decreased to 0.2 torr over a one hour period. The reactor is then repressurized to atmospheric pressure, and the product is charged through the bottom drain valve. The sulfonated polyester resin is analyzed for its onset glass transition temperature as in Example I, which is found to be 55.5° C. The resin of this example can then be emulsified in water at 50° C., resulting in an emulsion with a particle size of about 3 nanometers.

What is claimed is:

1. An ink for ink jet printing, comprising submicron-sized particles in a liquid vehicle, said particles comprising a colorant dispersed in an emulsifiable polymer resin, wherein said ink has a surface tension of from about 20 to about 70 dynes/cm and a viscosity of from about 0.7 to about 15 cP at 25° C.

2. The process of claim 1, wherein said dispersion is formed in a solvent, and at least part of said solvent is removed prior to emulsifying said particles in said liquid vehicle.

3. The process of claim 2, wherein said colorant is a dye and said solvent is an organic solvent.

4. The process of claim 1, wherein an ink formed of said emulsified particles in said liquid vehicle has a surface tension of from about 20 to about 70 dynes/cm and a viscosity of from about 0.7 to about 15 cP at 25° C.

* * * * *